No. 624,665. Patented May 9, 1899.
E. L. LEWIS.
ANIMAL TRAP.
(Application filed Dec. 14, 1898.)
(No Model.)

Witnesses:
G. H. Curtis.
J. G. Curtis.

Inventor:
Elliott L. Lewis
By Mosher & Curtis
attys.

UNITED STATES PATENT OFFICE.

ELLIOTT L. LEWIS, OF TROY, NEW YORK.

ANIMAL-TRAP.

SPECIFICATION forming part of Letters Patent No. 624,665, dated May 9, 1899.

Application filed December 14, 1898. Serial No. 699,211. (No model.)

*To all whom it may concern:*

Be it known that I, ELLIOTT L. LEWIS, a citizen of the United States, residing at Troy, county of Rensselaer, and State of New York, have invented certain new and useful Improvements in Animal-Traps, of which the following is a specification.

The invention relates to such improvements; and it consists of the novel construction and combination of parts hereinafter described and subsequently claimed.

Reference may be had to the accompanying drawings, and the letters of reference marked thereon, which form a part of this specification.

Similar letters refer to similar parts in the several figures therein.

Figure 1:
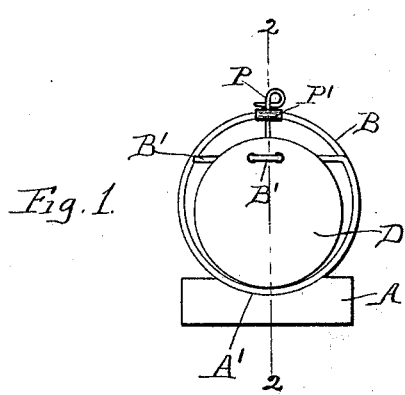
Figure 2:
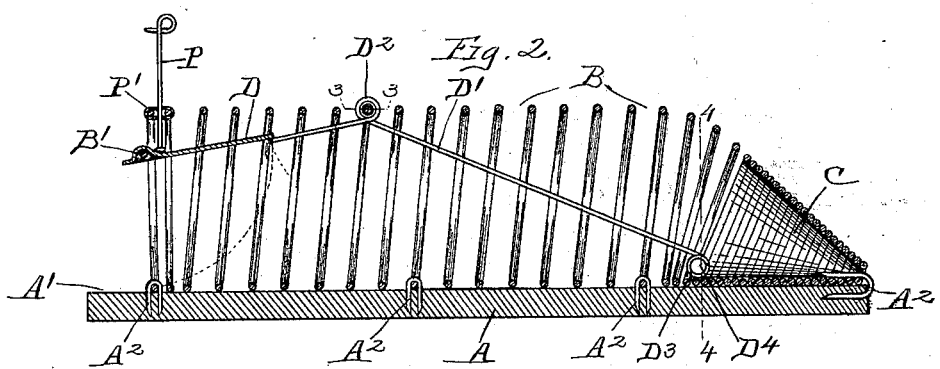
Figure 3:
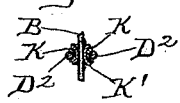
Figure 4:
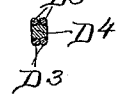

Figure 1 of the drawings is a view in front elevation of my improved animal-trap. Fig. 2 is a central vertical longitudinal section of the same, taken on the broken line 2 2 in Fig. 1. Fig. 3 is a cross-section taken on the broken line 3 3 in Fig. 2. Fig. 4 is a cross-section taken on the broken line 4 4 in Fig. 2.

The object of my invention is to provide a trap for rats, mice, and other animals which will prevent the escape or injury of the animals when caught and will permit the contents of the trap to be inspected without opening the trap.

A represents the supporting-base of the trap, which is preferably formed of wood, particularly when used for small animals, such as rats and mice. The upper surface of the base is provided with a longitudinal groove A', adapted to receive the under side of the cage.

The cage B and bait-receptacle C are formed from a single piece of wire, the cage being formed by bending one end of the wire into the form of an open-coiled cylindrical spiral and the bait-receptacle being formed by bending the other end of the wire into the form of a close-coiled conical spiral, as shown.

The convolutions of the bait-receptacle are located closely together to form an approximately closed wall for such receptacle, which not only confines the bait within the receptacle, but prevents access thereto except through the cage-chamber.

The convolutions of the cage are separated from each other sufficiently to permit free inspection of the interior of the cage and bait-receptacle, while at the same time they are located sufficiently close together to prevent the passage into or out of the chamber between such convolutions of any animal for the capture of which the trap is intended. The spaces between such convolutions will vary in traps of different sizes, the spaces being greater in traps used for the capture of larger animals.

The wire coils are secured to the base A by means of staples $A^2$.

The entrance to the cage is located at the opposite end of the trap from the bait-receptacle and is adapted to be closed by the door D, which is hinged to swing upon a horizontal axis, the hinge-pivot being formed by a straight end B' of the wire, which is bent to extend horizontally across the open end of the cage.

As a means for detachably holding the door in an open position and releasing the door to entrap an animal which has entered the cage I provide the trigger-wire D', which is formed with an eye or loop $D^2$ intermediate of its ends inclosing the cage-wire at the top of one of its convolutions, whereby the trigger-wire is fulcrumed upon the cage. One end of the trigger-wire extends forwardly toward the door, and its length is such that the arc traversed by such end when the trigger-wire is moved on its fulcrum intersects the arc traversed by the bottom edge of the swinging door. I am thus able by raising the door to a horizontal position and causing the neighboring end of the trigger-wire to engage the under side of the door to hold the door in an open position and by an oscillatory movement of the trigger-wire to swing its door-engaging end out of the path of the door, thereby releasing the door and permitting the same to fall by gravity to a closed position. The other end of the trigger-wire extends into the mouth of the bait-receptacle and is provided with a counterbalancing-weight, whereby the trigger-wire is adapted to support the weight of the door and hold the door in an open position so long as the weighted end of the wire occupies a position at or near the bottom of the cage or bait-receptacle. The weighted end of the trigger-wire is so located that an animal entering the cage is unable to gain access to the bait without engaging such weighted end, and in endeavoring to force it out of the mouth of the bait-receptacle the weighted end of the trigger-arm is lifted by the animal, thereby causing a corresponding downward movement of the door-engaging end of the wire and the closing of the released door.

As a means for locking the door in a closed position, I provide a keeper or locking-pin P, vertically movable in a guideway P', secured to the convolutions of the cage-wire above and slightly in rear of the hinge of the door. When the pin occupies its lowermost position in the guideway, its lower end engages or lies in close proximity to the inner side of the door, whereby an opening movement of the door is prevented by the engagement of the door with the pin. In setting the trap the pin is first raised in its guideway, after which the door is opened and engaged by the trigger-wire.

The counterbalancing-weight may be secured to the end of the trigger-wire in any known manner. As a means for securing the weight to the trigger-wire I have shown the end of the wire provided with a plurality of coils and the weight, formed by an ordinary lead shot, expanded within said coils. $D^3$ represents the coils, and $D^4$ the lead weight.

As a means for securing an extended bearing for the trigger-wire upon the cage-wire I insert an eyelet K through the fulcrum-loop $D^2$ of the trigger-wire and upset the same upon the loop-wire, and then insert a second eyelet K' through and upset it upon the first eyelet, the cage-wire passing through the aperture of the second eyelet. I am thus able to cheaply secure a wide bearing for the trigger-wire, which prevents a horizontal lateral swinging movement of the trigger-wire.

What I claim as new, and desire to secure by Letters Patent, is—

1. In an animal-trap, the combination with a supporting-base, of a loosely-coiled wire cage and a tightly-coiled wire bait-receptacle at one end of said cage and integral therewith; a door at the opposite end of the cage; and a trigger engageable at one end with the door, when open, and having its other end located in the mouth of the bait-receptacle, substantially as described.

2. In an animal-trap, the combination with a coiled-wire cage open at one end, and having the wire end bent to extend transversely across the open end of the cage; of a door hinged upon said transverse wire and adapted to close the open end of the cage, substantially as described.

3. A combined cage and bait-receptacle for animal-traps formed from a single piece of wire having one end coiled in the form of an open cylindrical spiral, and the other end coiled in the form of a close conical spiral, substantially as described.

4. In an animal-trap, the combination with a trigger-arm formed of wire with a plurality of coils at its end, of a lead weight expanded within said coils, substantially as described.

5. In an animal-trap, the combination with an open-coiled cylindrical cage, and a close-coiled conical spiral bait-receptacle at one end of the cage; of a door adapted to close the opposite end of the cage; and a trigger fulcrumed upon one of the convolutions of the open coil and engageable at one end with the door, and having its other end located in the mouth of the bait-receptacle, substantially as described.

6. In an animal-trap, the combination with a coiled-wire cage, of a trigger formed from a piece of wire having a loop intermediately of its ends loosely inclosing one of the convolutions of the cage; and an eyelet inserted through said loop and upset upon the trigger-wire and loosely inclosing said convolution of the cage-wire, substantially as described.

7. In an animal-trap, the combination with a cage open at one end, and a door hinged to swing upon a horizontal axis to close the open end of the cage, of a locking-pin, and a vertical guideway for the pin supported by the cage above and slightly in rear of the door, substantially as described.

In testimony whereof I have hereunto set my hand this 4th day of December, 1898.

ELLIOTT L. LEWIS.

Witnesses:
FRANK C. CURTIS,
EVA C. LEWIS.